(12) United States Patent
Katayama et al.

(10) Patent No.: US 6,926,924 B2
(45) Date of Patent: Aug. 9, 2005

(54) METAL-COMPOSITE HOSE AND A PROCESS FOR MANUFACTURING THE SAME

(75) Inventors: Kazutaka Katayama, Komaki (JP); Motoshige Hibino, Komaki (JP); Atsuo Miyajima, Inuyama (JP); Hiroaki Ito, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 142 days.

(21) Appl. No.: 10/123,194

(22) Filed: Apr. 17, 2002

(65) Prior Publication Data

US 2002/0174906 A1 Nov. 28, 2002

(30) Foreign Application Priority Data

Apr. 19, 2001 (JP) ........................................ 2001-120528

(51) Int. Cl.[7] ................................................. B05D 7/22
(52) U.S. Cl. ........................ 427/239; 427/468; 427/486; 427/195; 427/282; 427/287; 427/435; 428/35.8
(58) Field of Search ................................. 427/468, 469, 427/485, 486, 470, 195, 202, 421, 425, 434.3, 434.6, 435, 282, 287, 230, 239; 428/35.7–35.9

(56) References Cited

U.S. PATENT DOCUMENTS

| | | | |
|---|---|---|---|
| 2,074,935 A | * | 3/1937 | Potthoff |
| 2,724,660 A | * | 11/1955 | Ingalls et al. |
| 3,459,578 A | * | 8/1969 | Laulan |
| 3,565,664 A | * | 2/1971 | Al |
| 3,675,950 A | * | 7/1972 | Beene |
| 4,781,958 A | | 11/1988 | Gilbert ........................ 428/76 |
| 4,999,903 A | | 3/1991 | Bujes ........................ 29/469.5 |
| 5,472,746 A | * | 12/1995 | Miyajima et al. |
| 6,099,908 A | * | 8/2000 | Hirano |

FOREIGN PATENT DOCUMENTS

| | | |
|---|---|---|
| JP | 07-275981 | 10/1995 |
| JP | 08-127101 | 5/1996 |
| JP | 2001-341230 | 12/2001 |

* cited by examiner

Primary Examiner—Fred J. Parker
(74) Attorney, Agent, or Firm—Jacobson Holman PLLC

(57) ABSTRACT

A metal-composite hose having a wall including an innermost metal layer and a resin layer surrounding it, in which the metal layer has at each end portion of the hose an inner surface covered with a resin layer, an elastic rubber layer, or both. A process for manufacturing a metal-composite hose includes: forming a metal layer; covering the metal layer with an elastic rubber layer, if required; and after masking a specific portion of the metal layer, forming a thermoplastic resin layer thereon by powder or spray coating. The hose is preferably a corrugated one. It has high fluid impermeability, flexibility and strength, as well as high metal-rust resistance and sealing property at both ends.

10 Claims, 3 Drawing Sheets

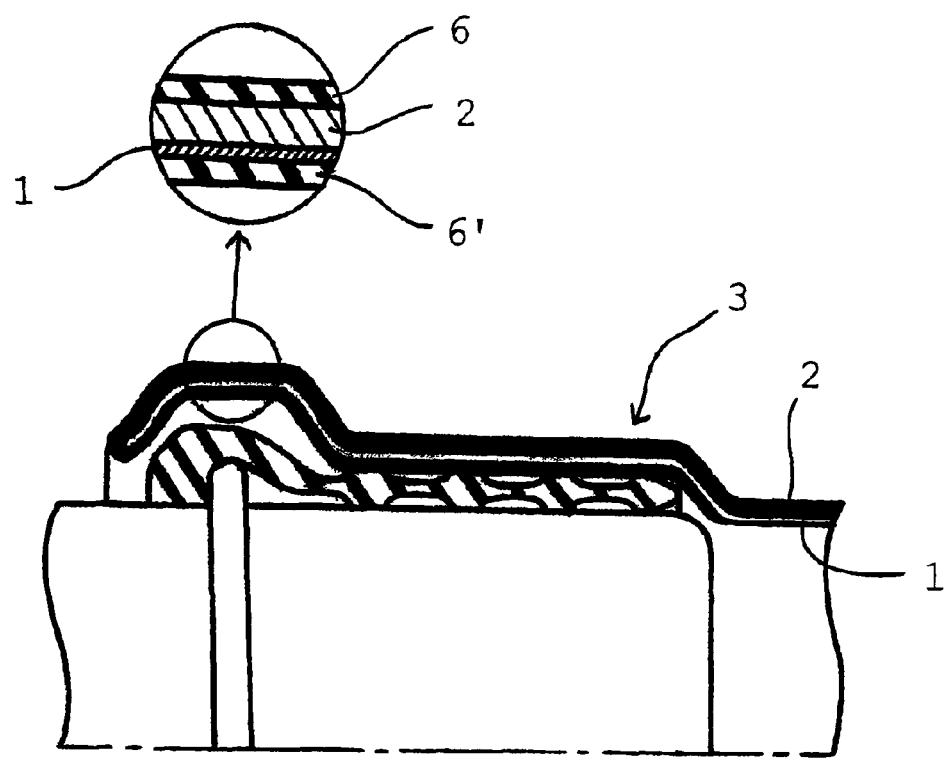

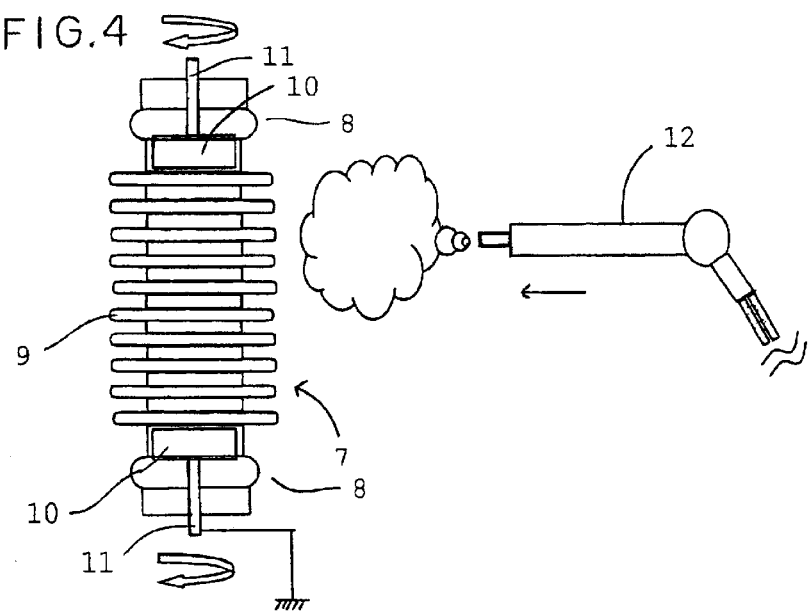
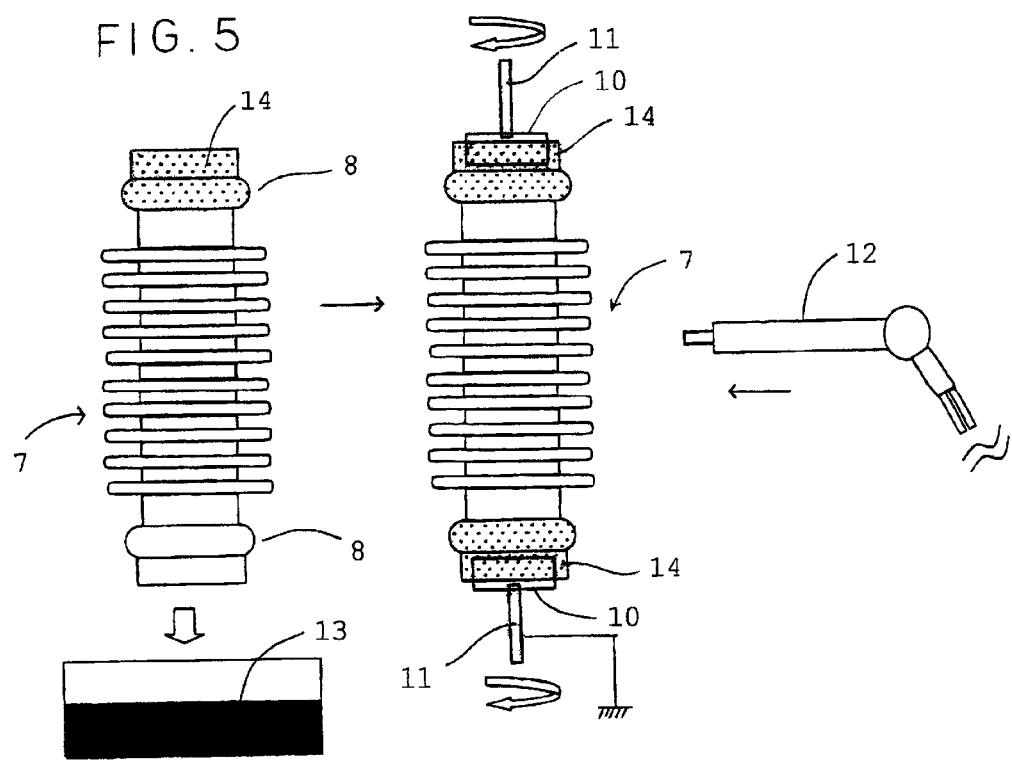

METAL-COMPOSITE HOSE AND A PROCESS FOR MANUFACTURING THE SAME

BACKGROUND OF THE INVENTION

1. Field of the Invention

This invention relates to a metal-composite hose used in a fluid pipeline, such as a fuel or refrigerant hose, and a process for manufacturing the same. More particularly, it relates to a metal-composite hose having high fluid impermeability, flexibility and strength, as well as high metal-rust resistance and sealing property at both ends, and a process for the effective manufacture thereof. This invention is particularly favorably applied to a corrugated metal-composite hose. A corrugated hose is a hose having a corrugated wall along at least a part of its length excluding both ends.

2. Description of the Related Art

Various kinds of rubber hoses have usually been used as, for example, fuel hoses of motor vehicles. Rubber hoses are good in vibration absorbability and flexibility for assembly. A new type of rubber hose has recently come to draw attention in view of its fuel impermeability considered important for environmental protection. For example, there is a hose having a wall formed from resin having a higher fuel impermeability than rubber, and bent or corrugated partly for improved vibration absorbability and flexibility.

Further tightening of fuel emission control is, however, expected. It is also necessary to consider measures against a highly permeant fluid, such as a carbon dioxide refrigerant, or hydrogen gas for a fuel cell. It is, therefore, necessary to consider a corrugated metal and resin composite hose having a barrier metal layer expected to provide a very high fluid impermeability and a reinforcing resin layer, and corrugated to ensure flexibility.

A corrugated metal and resin composite hose is disclosed in, for example, JP Kokai No. 275981/1995. It is manufactured by coating the outer surface of a straight metal pipe with a resin layer and corrugating the metal and resin layers together by drawing, hydroforming or the like. Such corrugation, however, permits their deformation only to a limited degree, whether by drawing or by hydroforming. The metal layer is, for example, likely to break unless its elongation is limited to 20% or less. Such a limited deformation does not allow any satisfactory plastic deformation of the resin layer. As a result, the stress produced by the resin layer during the corrugation of the pipe makes it difficult for the metal layer to retain its corrugated shape. Such difficulty may be overcome by forming a relatively thick metal layer and a relatively thin resin layer. The mere formation of a thick metal layer may, however, result in a corrugated hose having a higher cost, a greater weight and a lower flexibility. The mere formation of a thin resin layer may result in a hose which is so low in mechanical strength as to collapse when it is installed.

Another serious problem encountered usually by a metal and resin composite hose is the fatigue failure of its metal layer caused by its repeated vibration and deformation. Such fatigue failure of the metal layer has to be prevented by the effective reinforcement by the resin layer. The inventors of this invention have found that any imbalance in thickness between a metal and a resin layer is likely to cause insufficient reinforcement by the resin layer and the resultant fatigue failure of the metal layer.

JP Kokai No. 127101/1996 discloses a metal and resin composite hose for supplying hot water for cooking, washing or heating, or for discharging waste water. It has a multilayer wall composed of a metal layer, a modified polyolefin layer and a polybutene layer, formed by two cycles of resin powder coating around a metal layer, to give it hot water resistance and prevent its cracking.

The inventors of this invention have proposed a corrugated metal-composite hose and a process for manufacturing the same in JP Kokai No. 341230/2001. The hose is satisfactory in all of fluid impermeability, flexibility for installation and vibration absorbability, and strength to resist collapsing when it is installed. Moreover, its resin layer is effective for reinforcing its metal layer against fatigue failure.

The inventors' further research has, however, revealed the following. Water, such as rainwater, splashed water containing an antifreezing agent, or condensed moisture, may collect at a joint portion (or a sealing portion) at the end of the hose. The conventional metal-composite hose has its metal layer exposed at each end thereof to a sealing portion. Namely, the metal layer at each end serves as a sealing surface against a connecting pipe or the like. Such a hose may have insufficient water seal, and the collected water may corrode the metal layer.

SUMMARY OF THE INVENTION

It is an object of this invention to provide a metal-composite hose, particularly a corrugated metal-composite hose having improved seal at a joint or sealing portion at each end thereof and protected from corrosion by collected water.

According to a first aspect of this invention, there is provided a metal-composite hose comprising an innermost metal layer and a resin layer formed on an outer surface of the metal layer, wherein the metal layer has at each end of the hose an inner surface covered with a resin layer and/or an elastic rubber layer.

The hose shows a very high fluid impermeability owing to its innermost metal layer. It can be expected to be highly impermeable to any highly permeant fluid, such as a carbon dioxide refrigerant or hydrogen gas for a fuel cell. The resin layer surrounding the metal layer provides its effective protection and reinforcement.

The metal layer has at each end of the hose an inner surface covered with a resin layer and/or an elastic rubber layer. The covering layer enables the metal layer to make a good seal against water collected at a joint portion of the hose and ensures its rustproofing. An elastic rubber layer provides a particularly effective seal around a pipe to be connected with the hose, particularly at a low temperature.

The metal layer is protected between the outer resin layer and the inner resin or elastic rubber layer at the joint portion of the hose. Accordingly, the hose is of improved strength and pull-out resistance at each end. The metal layer is effectively protected at the joint potion of the hose at which it is more likely to break.

According to a second aspect of this invention, the inner surface of the metal layer at each end of the hose is covered with a resin layer as in the first aspect, but formed continuously with the resin layer on the outer surface of the metal layer to cover each end of the metal layer with the resin layer.

According to the second aspect, the resin layer covering the metal layer at each end prevents any corrosion of the metal layer starting at each end thereof. It also prevents any infiltration of water through the boundary between the metal and resin layers at each end of the metal layer.

According to a third aspect of this invention, the inner surface of the metal layer at each end of the hose is covered with an elastic rubber layer as in the first aspect, but formed continuously to the outer surface of the metal layer to cover each end of the metal layer with the elastic rubber layer.

According to the third aspect, the resin layer covering the metal layer at each end prevents any corrosion of the metal layer starting at each end thereof. It also prevents any infiltration of water through the boundary between the metal and resin layers at each end of the metal layer.

According to a fourth aspect of this invention, the hose according to any of the first to third aspects thereof has its wall corrugated along at least a part of its length excluding the end portions. The corrugated wall ensures the high flexibility of the hose.

According to a fifth aspect of this invention, the metal layer in the corrugated wall portion of the hose according to the fourth aspect of this invention has a thickness A of at least 20 $\mu$m, but less than 200 $\mu$m, while the resin layer surrounding the metal layer has a thickness B of 80 to 5000 $\mu$m, and the thicknesses A and B have a ratio of 1:4 to 1:50.

According to the fifth aspect, the metal layer in the corrugated wall portion of the hose has a thickness A of at least 20 $\mu$m. This is the minimum thickness that usually allows the corrugation of the metal layer without pinholes or like defects formed therein. It ensures the satisfactorily high fluid impermeability of the hose. Accordingly, the hose can stand any further tightening of fuel emission control, and can be used to convey any highly permeant fluid, such as a carbon dioxide refrigerant or hydrogen gas. The thickness A is, however, less than 200 $\mu$m to ensure that the hose be satisfactorily high in flexibility for easy installation and effective vibration damping.

The resin layer in the corrugated wall portion has a thickness B of at least 80 $\mu$m. It, therefore, ensures that the hose be sufficiently high in mechanical strength not to collapse when it is installed. Its thickness B does, however, not exceed 5000 $\mu$m, so that the hose may not have any unreasonable increase in weight.

The thickness B of the resin layer is at least four times as large as the thickness A of the metal layer, so that there may not be any imbalance in thickness between the two layers. In other words, the metal layer is not too large in thickness relative to the resin layer, or the resin layer is not too small in thickness relative to the metal layer. As a result, the resin layer ensures the effective reinforcement of the metal layer. Thus, it is possible to prevent any fatigue failure of the metal layer effectively, particularly in the corrugated wall portion of the hose, despite its repeated vibration and deformation. The thickness B is, however, not more than 50 times larger than the thickness A, so that the resin layer may not be too large in thickness. Thus, it is possible to avoid any unreasonable increase in weight of the hose.

According to a sixth aspect of this invention, the elastic rubber layer in the hose according to any of the first to fifth aspects of this invention is of fluororubber (FKM), a low temperature flexible fluoroelastomer, epichlorohydrin rubber (ECO), acrylonitrile-butadiene rubber (NBR), hydrogenated acrylonitrile-butadiene rubber (H-NBR), chloroprene rubber (CR), urethane rubber (U), fluorosilicone rubber (FVMQ), chlorosulfonated polyethylene rubber (CSM), chlorinated polyethylene rubber (CPE), butyl rubber (IIR), chlorinated butyl rubber (Cl-IIR), brominated butyl rubber (Br-IIR), acrylic rubber (ACM), ethylene-propylene rubber (EPR), ethylene-propylene-diene terpolymer rubber (EPDM), natural rubber (NR), isoprene rubber (IR), styrene-butadiene rubber (SBR), butadiene rubber (BR), silicone rubber (Q), a blend(NE) of NBR and EPDM, or a blend of NBR and polyvinylchloride (PVC).

Every material as listed above enables an elastic rubber layer to make a particularly good seal even at a low temperature and adhere closely to the metal layer.

According to a seventh aspect of this invention, there is provided a process for manufacturing a metal-composite hose which comprises: forming a tubular metal layer; and after masking the inner surface of the metal layer except at each end of the hose, forming a thermoplastic resin layer by powder or spray coating on the outer surface of the metal layer and its inner surface at each end of the hose.

According to the seventh aspect, the resin layer is formed by powder or spray coating on the tubular metal layer. Accordingly, there is no longer any such restriction as imposed by the known manufacturing process upon the thickness of the resin or metal layer as stated before, even if the hose may be a corrugated one. The resin and metal layers can each be formed with a desirable thickness. Thus, it is possible to avoid any unduly large thickness of the metal layer leading to an increase of manufacturing cost or weight, or a reduction in flexibility of the corrugated hose. It is also possible to avoid any unduly small thickness of the resin layer leading to a reduction in mechanical strength of the hose.

According to an eighth aspect of this invention, there is provided a process for manufacturing a metal-composite hose which comprises: forming a tubular metal layer; dip coating each end of the metal layer with an elastic rubber compound or solution to form an elastic rubber layer on each end portion thereof; and after masking the whole inner surface of the metal layer, forming a thermoplastic resin layer on the outer surface of the metal layer by powder or spray coating.

According to the eighth aspect, the elastic rubber layer is formed on the tubular metal layer at each end thereof, and the resin layer is then formed on the outer surface of the metal layer. Accordingly, there is no longer any restriction imposed by the manufacturing process upon the thickness of the resin or metal layer, even if the hose may be a corrugated one, as in the seventh aspect of this invention. The process can, thus, be expected to be effective as in the seventh aspect of this invention.

According to a ninth aspect of this invention, there is provided a process for manufacturing a metal-composite hose which comprises: forming a tubular metal layer; dip coating each end of the metal layer with an elastic rubber compound or solution to form an elastic rubber layer on each end portion thereof; and after masking the inner surface of the metal layer except at its end portions, forming a thermoplastic resin layer on the outer surface of the metal layer and its inner surface at each end portion by powder or spray coating.

According to the ninth aspect, the elastic rubber layer is formed on the tubular metal layer at each end thereof, and the resin layer is then formed on the outer surface of the metal layer and its inner surface at each of its ends. Accordingly, there is no longer any restriction imposed by the manufacturing process upon the thickness of the resin or metal layer, even if the hose may be a corrugated one, as is the case with the seventh aspect of this invention. The process can, thus, be expected to be as effective as that in the seventh aspect of this invention.

According to a tenth aspect of this invention, there is provided a process for manufacturing a metal-composite hose which comprises: forming a tubular metal layer; after masking the whole inner surface of the metal layer, forming a thermoplastic resin layer on the outer surface of the metal layer by powder or spray coating; and after unmasking the inner surface of the metal layer, dip coating the opposite end portions of the metal and resin layers with an elastic rubber compound or solution to form an elastic rubber layer on each end portion thereof.

According to the tenth aspect, the resin layer is formed on the outer surface of the tubular metal layer, and the elastic rubber layer is then formed on each end of the metal and resin layers. Accordingly, there is no longer any restriction imposed by the manufacturing process upon the thickness of the resin or metal layer, even if the hose may be a corrugated one, as is the case with the seventh aspect of this invention. The process can, thus, be expected to be as effective as that according to the seventh aspect of this invention.

According to an eleventh aspect of this invention, the hose manufactured by the process according to any of the seventh to tenth aspects of this invention has its wall corrugated along at least a part of its length excluding its opposite ends. The corrugated hose is preferable for exhibiting the advantages of the hose according to any of the seventh to tenth aspects of this invention particularly effectively.

The above and other advantages of the invention will become more apparent from the following description and the accompanying drawings.

BRIEF DESCRIPTION OF THE DRAWINGS

FIG. 3 is a sectional view showing the construction of still another metal-composite hose embodying this invention at one end;

FIG. 4 is a diagram illustrating a process embodying this invention for manufacturing a metal-composite hose; and FIG. 5 is a diagram illustrating another process embodying this invention for manufacturing a metal-composite hose.

DETAILED DESCRIPTION OF THE INVENTION

[Metal-Composite Hose]

Figure 1:
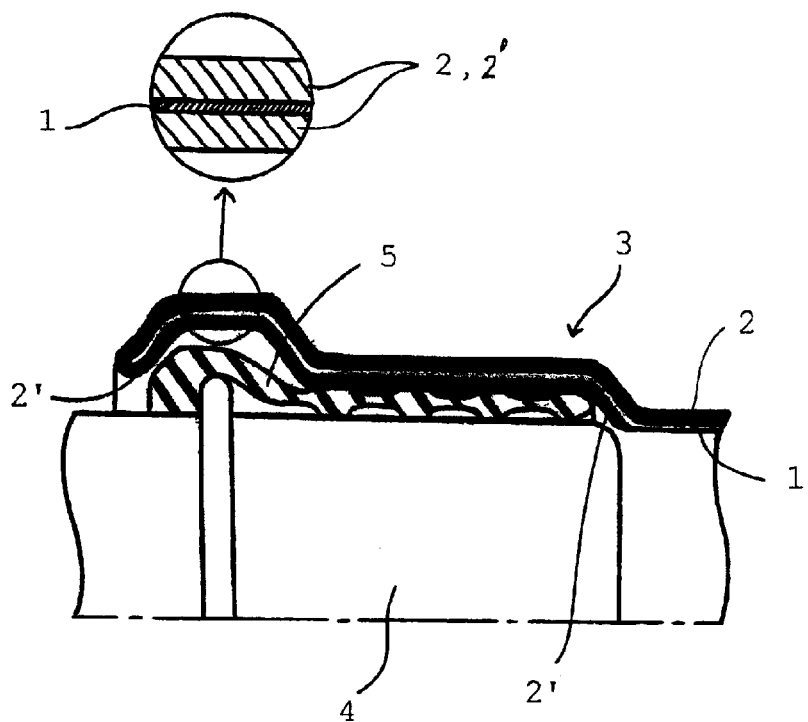
FIG. 1 is a sectional view showing the construction of a metal-composite hose embodying this invention at one end.

The metal-composite hose according to this invention has a multilayer wall formed of at least an innermost metal layer and a resin layer formed on an outer surface of the metal layer. The metal and resin layers preferably adhere strongly to each other owing to their surface treatment, the aid of an adhesive, etc. The resin layer may be surrounded by any of various kinds of protective layers, if required. The hose may have its wall corrugated partially or mostly along its length excluding its opposite ends (the hose joint portions), while its remaining portion may be a straight or curved hose having a smooth wall.

The hose is used for conveying various kinds of fluids, i.e. liquids or gases. It is used as, for example, a fuel hose for a gasoline-fueled motor vehicle. It is also used as a fuel hose for a fuel cell-driven vehicle. It is also used as a domestic fuel hose. The term "fuel" as herein used includes gasoline, alcohol, hydrogen gas, natural gas, propane gas, dimethyl ether (DME), etc. The hose can also be used as a hose for a refrigerant, such as chlorofluorocarbon or carbon dioxide, or as an air hose for a motor vehicle.

[Metal and Resin Layers]

The metal layer is a barrier layer of very high fluid impermeability forming the innermost layer of the metal-composite hose. The resin layer surrounds the metal layer and is primarily intended for reinforcing it. The resin layer is effective for various reinforcing purposes. It reinforces the hose to maintain it in its tubular shape when it is installed. If the hose is a corrugated one, the resin layer protects the metal layer from fatigue failure in the corrugated portion of the hose. It also protects the metal layer from corrosion.

The material of the metal layer is not limited. However, it is preferably, for example, steel or an alloy steel (such as stainless steel), aluminum or an aluminum alloy, copper or a copper alloy, or nickel or a nickel alloy. Stainless steel is, among others, preferred for its high strength and corrosion resistance. The metal layer preferably has a thickness A of at least 20 $\mu$m, but less than 200 $\mu$m for the operational and effect reasons as stated before.

The material of the resin layer is selected from thermoplastic resins. A polyolefin, polyester or polyamide resin is, among others, preferred for its good balance of heat resistance, physical properties and flexibility. More specifically, what is preferable is polyethylene (PE), polypropylene (PP), polyketone, polybutylene terephthalate (PBT), polyamide 6 (PA6), polyamide 11 (PA11), or polyamide 12 (PA12). The resin layer preferably has a thickness B of 80 to 5000 $\mu$m for the operational and effect reasons as stated before. It more preferably has a thickness of 300 to 5000 $\mu$m if the hose is not a corrugated one, or a thickness of 80 to 1500 $\mu$m in its corrugated portion if the hose is a corrugated one.

The thicknesses A and B as defined above have a ratio (A:B) preferably in the range of 1:4 to 1:50, and more preferably in the range of 1:4.5 to 1:10. If B is less than four times as large as A, the resin layer cannot reinforce the metal layer satisfactorily. As a result, the metal layer is likely to undergo fatigue failure in the corrugated portion of the hose. If B exceeds 50 times as large as A, the resin layer cannot be expected to produce any better reinforcing result, but adds unnecessarily to the weight of the hose. The ratio A:B in the range of 1:4.5 to 1:10 is particularly preferred for making a corrugated metal-composite hose of light weight having a metal layer which does not easily undergo any fatigue failure.

[Joint Portions of the Hose]

The metal-composite hose according to this invention is featured by a resin or elastic rubber layer, or both covering the inner surface of the metal layer at each end of the hose (i.e. at a hose joint portion or a sealing portion). This ensures a tight seal at the hose joint portion and enables to prevent any fracture or corrosion of the metal layer at that portion. The metal layer is preferably covered with such a resin or elastic rubber layer even at each end thereof, so that its ends may also be protected from corrosion.

If the inner surface of the metal layer is covered at each end of the hose with an elastic rubber layer, it makes a still better seal about a pipe connected to it even at a low temperature. Therefore, if the inner surface of the metal layer is covered with both a resin layer and an elastic rubber layer, the rubber layer had better be formed on or radially inwardly of the resin layer so as to contact a pipe connected to the hose.

A known rubber retainer (or rubber seal) can be interposed between the hose and the pipe connected to it, as will later be described with reference to FIG. 1 or 2. The retainer enables the hose to make a still better seal (even at a low temperature) and have a still greater pull-out force (or pull-out resistance) at each end. If any such retainer is employed, the hose may be so shaped at each end thereof as to fit the retainer.

There is no particular limitation imposed on the material of the resin layer covering the inner surface of the metal layer at either end of the hose. It is, however, preferable to use the same material with the resin layer surrounding the metal layer as mentioned before.

There is also no particular limitation imposed on the material of the elastic rubber layer covering the inner surface of the metal layer at either end of the hose. It is, however, preferable for the reasons as stated before to use FKM, a low temperature flexible fluoroelastomer (fluororubber), ECO, NBR, H-NBR, CR, U, FVMQ, CSM, CPE, IIR, Cl-IIR, Br-IIR, ACM, EPR, EPDM, NR, IR, SBR, BR, Q, NE or NBR-PVC.

GLT, a product of Du Pont Dow Elastomers having a fluorine content of 65% and containing vinylidene fluoride, is a speicific example of low temperature flexible fluoroelastomers. Another example is GFLT of the same company having a fluorine content of 67% and containing vinylidene fluoride, tetrafluoroethylene, perfluoromethyl vinyl ether as low temperature flexible monomers, and a cure site monomer. Still another example is SIFEL (Registered Trademark), a product of Shin-Etsu Chemical Co., Ltd.

The material of the elastic rubber layer is preferably selected in accordance with the purpose for which the hose will be used. For example, IIR, EPDM, NR, IR, SBR, BR, FVMQ or Q having excellent low-temperature properties is preferred for a refrigerant hose in which a low temperature will prevail as a result of pressure reduction or vaporization. Fluororubber is preferred for a fuel hose, or any other hose for conveying a hydrocarbon fluid, in view of its adherence which may occur when the hose is connected or disconnected.

[Process for Manufacturing a Metal-Composite Hose]

Although no limitation is imposed on a process for manufacturing a metal-composite hose, the processes according to the seventh to tenth aspects of this invention are particularly preferable. These processes are preferably applied to particularly a corrugated metal-composite hose.

(Process According to the Seventh Aspect)

In the process according to the seventh aspect of this invention, a metal layer having an appropriate tubular shape is formed using a metal tube. An appropriate tubular shape is, for example, a straight, curved or corrugated tubular shape. Then, after the inner surface of the metal layer is masked with an appropriate device except at each end of the hose, a thermoplastic resin layer is formed on the outer surface of the metal layer and its inner surface at each end of the hose by powder or spray coating.

According to this process, the resin layer covering the inner surface of the metal layer at each end of the hose and the resin layer on its outer surface are formed continuously with each other to cover even each end of the metal layer. No limitation is imposed on a method of forming a metal layer in a corrugated tubular shape. Such a layer can, for example, be formed by corrugating a metal tube with forming rolls. Alternatively, a hydroforming process can be employed for corrugating a metal tube in a hydroforming mold by applying a liquid pressure to the inside of the tube.

(Processes According to the Eighth and Ninth Aspects)

In the process according to the eighth aspect of this invention, a metal layer having an appropriate tubular shape is first formed using a metal tube, as in the process according to the seventh aspect. Then, an elastic rubber layer is formed on each end of the metal layer by dip coating from an elastic rubber compound or solution. Then, after the whole inner surface of the metal layer is masked, a thermoplastic resin layer is formed on the outer surface of the metal layer by powder or spray coating.

In the process according to the ninth aspect of this invention, a metal layer having an appropriate tubular shape is first formed using a metal tube, as in the process according to the seventh aspect. Then, an elastic rubber layer is formed as in the process according to the eighth aspect. Then, after the inner surface of the metal layer is masked except at each end thereof, a thermoplastic resin layer is formed on the outer surface of the metal layer and its inner surface at each end by powder or spray coating.

In either process, the elastic rubber layer covering the inner surface of the metal layer at each end of the hose and the elastic rubber layer covering its outer surface are formed continuously with each other to evenly cover each end of the metal layer. According to the ninth aspect, the resin layer is formed continuously in a manner to cover the elastic rubber layer formed, so that each end of the metal layer is covered doubly with the elastic rubber and resin layers. A metal layer in a corrugated tubular shape may be formed as in the seventh aspect.

(Process According to the Tenth Aspect)

In the process according to the tenth aspect of this invention, a metal layer having an appropriate tubular shape is first formed using a metal tube, as in the process according to the seventh aspect. Then, after the whole inner surface of the metal layer is masked, a thermoplastic resin layer is formed on the outer surface of the metal layer by powder or spray coating. Then, after the inner surface of the metal layer is unmasked, the metal and resin layers are dip coated at each end with an elastic rubber compound or solution. An elastic rubber layer is formed thereon by the vulcanization of the compound, or the removal of the solvent from the solution.

The elastic rubber layer is formed continuously from the inner to the outer surfaces of the metal and resin layers around their ends. Therefore, the ends of the metal and resin layers and their boundaries are covered with the elastic rubber layer. A metal layer in a corrugated tubular shape may be formed as in the seventh aspect.

DESCRIPTION OF THE PREFERRED EMBODIMENTS

EXAMPLE 1

Example 1 gives several examples of construction for end portions of metal-composite hoses.

FIG. 1 shows a metal-composite hose 3 including an innermost metal layer 1 and a resin layer 2 surrounding it, both formed from adequate materials, respectively. The hose 3 has an end portion connected with a pipe 4. A rubber retainer 5 is interposed between the hose 3 and the pipe 4 to provide an effective seal therebetween.

The metal layer 1 has an inner surface covered at the end portion of the hose 3 with a resin layer 2' of the same material as the resin layer 2, as shown in detail by an enlarged portion of FIG. 1. As the resin layer 2' is formed continuously with the resin layer 2, the metal layer 1 has its end covered with a resin layer. The resin layer 2' has a length corresponding to the length of the joint portion (sealing portion) of the hose 3 along which the pipe 4 extends thereinto.

Figure 2:
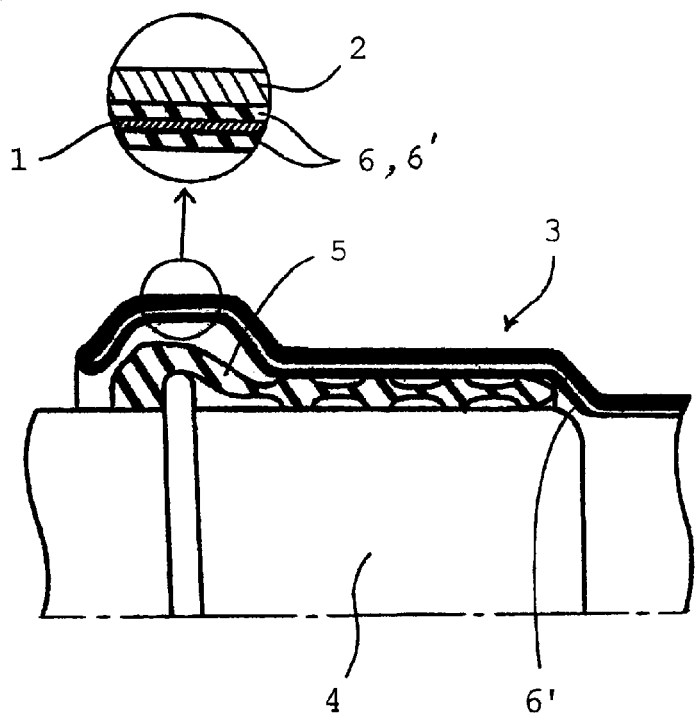
FIG. 2 is a sectional view showing the construction of another metal-composite hose embodying this invention at one end.

FIG. 2 shows in an enlarged portion thereof a metal layer 1 having at an end portion of a metal-composite hose 3 an outer surface covered with an elastic coating layer 6 of an adequate rubber material and an inner surface covered with an elastic coating layer 6' of the same rubber material. The elastic coating layers 6 and 6' are formed continuously with each other, so that the metal layer 1 has its end covered with an elastic coating layer. A resin layer 2 surrounds the metal layer 1. At the end portion of the hose, the metal layer 2 surrounds the elastic coating layer 6. The elastic coating layers 6 and 6' have a length corresponding to the length of the end portion of the hose 3 along which a pipe 4 extends thereinto. The other features shown in FIG. 2 are identical to their counterparts in FIG. 1.

FIG. 3 shows a metal-composite hose 3 including a metal layer 1 having an outer surface covered with a resin layer 2. At the end portion of the hose 3, the resin layer 2 has an outer surface covered with an elastic coating layer 6 of an adequate rubber material and the metal layer 1 has an inner surface covered with an elastic coating layer 6' of the same rubber material, as shown in a partially enlarged figure. The elastic coating layers 6 and 6' are formed continuously with each other, so that the metal and resin layers 1 and 2 have their ends covered with an elastic coating layer. The elastic coating layers 6 and 6' have each a length corresponding to the length of the end portion of the hose 3 along which a pipe 4 extends thereinto. The other features shown in FIG. 2 are identical to their counterparts in FIG. 1.

EXAMPLE 2

Example 2 gives several examples of processes for manufacturing metal-composite hoses.

Referring to FIG. 4, a metal layer 7 in a corrugated tubular shape is first prepared. The metal layer 7 has a pair of opposite end portions 8 each shaped adequately for connecting a pipe therein, and a corrugated central portion 9. The metal layer 7 has its inner surface masked with plugs 10 except at its end portions 8. The plugs 10 are preferably rotatable by a rotary shaft 11. Then, the metal layer 7 has its outer surface and its inner surface at each end portion 8 coated with a powder of a suitable thermoplastic resin by an electrostatic coating gun 12. The metal layer 7 is preferably rotated by the rotary shaft 11 during its resin powder coating. The resin is, then, melted to form a resin layer.

Referring to FIG. 5, there is prepared a metal layer 7 similar to that shown in FIG. 4. The metal layer 7 has each of its end portions 8 dipped in a liquid elastic rubber compound 13. The metal layer 7 may alternatively have each of its end portions 8 dipped in an elastic rubber solution prepared by using a good solvent. The elastic rubber compound 13 adhering to the inner surface of the metal layer 7 at each of its end portions 8 and to its outer surface is vulcanized, or the solvent is volatilized from the similarly adhering elastic rubber solution. As a result, an elastic rubber layer 14 is formed to cover the inner surface of the metal layer 7 at its end portions 8 and its outer surface. Then, the metal layer 7 has its inner surface masked with plugs 10. The plugs 10 are preferably rotatable by a rotary shaft 11. Then, the metal and elastic rubber layers 7 and 14 have their whole outer surfaces coated with a powder of a suitable thermoplastic resin by an electrostatic coating gun 12. The metal layer 7 is preferably rotated by the rotary shaft 11 during its resin powder coating. The resin is, then, melted to form a resin layer.

While the invention has been described by its preferred embodiments, it is to be understood that variations or modifications may be easily made by those skilled in the art without departing from the scope of this invention which is defined by the appended claims.

What is claimed is:

1. A process for manufacturing a metal-composite hose which has a tubular metal layer, which process comprises the sequential steps selected from the groups consisting of:
   A) 1) masking the inner surface of the tubular metal layer except at end portions of the hose; and
   2) forming a thermoplastic resin layer by powder or spray coating on the outer surface of the tubular metal layer and on the unmasked inner surface on the end portions of the hose;
   B) 1) dip coating end portions of the tubular metal layer with an elastic rubber compound or solution to form an elastic rubber layer on each end portion thereof;
   2) masking the whole inner surface of the tubular metal layer; and
   3) forming a thermoplastic resin layer on the outer surface of the tubular metal layer by powder or spray coating;
   C) 1) dip coating end portions of the tubular metal layer with an elastic rubber compound or solution to form an elastic rubber layer on each end portion thereof;
   2) masking the uncoated inner surface of the inner layer; and
   3) forming a thermoplastic resin layer on the outer surface of the tubular metal layer and on its inner surface at each end portion by powder or spray coating; and
   D) 1) masking the whole inner surface of the tubular metal layer;
   2) forming a thermoplastic resin layer on the outer surface of the tubular metal layer by powder or spray coating;
   3) unmasking the inner surface of the tubular metal layer; and
   4) dip coating end portions of the metal and resin layers with an elastic rubber compound or solution to form an elastic rubber layer on each end portion thereof.

2. A process according to claim 1 which comprises spray coating the thermoplastic resin layer.

3. A process according to claim 1 for manufacturing a metal-composite hose which comprises:
   forming a tubular metal layer; and
   after masking the inner surface of the tubular metal layer, except at end portions of the hose, forming a thermoplastic resin layer by powder or spray coating on the outer surface of the metal layer and on the unmasked end portions of the inner surface of the hose.

4. The process according to claim 3, wherein the hose is corrugated along at least a part of its length except at its end portions.

5. A process according to claim 1 for manufacturing a metal-composite hose which comprises:
   forming a tubular metal layer;
   dip coating end portions of the tubular metal layer with an elastic rubber compound or solution to form an elastic rubber layer on each end portion thereof; and
   after masking the whole inner surface of the tubular metal layer, forming a thermoplastic resin layer on the outer surface of the metal layer by powder or spray coating.

6. The process according to claim 5, wherein the hose is corrugated along at least a part of its length except at its end portions.

7. A process according to claim 1 for manufacturing a metal-composite hose which comprises:

forming a tubular metal layer;

dip coating end portions of the tubular metal layer with an elastic rubber compound or solution to form an elastic rubber layer on each end portion thereof;

masking the uncoated inner surface of the tubular metal layer; and forming a thermoplastic resin layer on the outer surface of the tubular metal layer and on its inner surface at each end portion by powder or spray coating.

8. The process according to claim 7, wherein the hose is corrugated along at least a part of its length except at its end portions.

9. A process according to claim 1 for manufacturing a metal-composite hose which comprises:

forming a tubular metal layer;

masking the whole inner surface of the tubular metal layer;

forming a thermoplastic resin layer on the outer surface of the tubular metal layer by powder or spray coating;

unmasking the inner surface of the tubular metal layer; and dip coating end portions of the metal and resin layers with an elastic rubber compound or solution to form an elastic rubber layer on each end portion thereof.

10. The process according to claim 9, wherein the hose is corrugated along at least a part of its length except at its end portions.

* * * * *